United States Patent [19]

Rao et al.

[11] Patent Number: 4,565,674

[45] Date of Patent: Jan. 21, 1986

[54] ALUMINA CHLORINATION

[75] Inventors: Yalamanchili K. Rao; Mohamad K. Soleiman, both of King County, Wash.

[73] Assignee: Washington Research Foundation, Seattle, Wash.

[21] Appl. No.: 579,026

[22] Filed: Feb. 10, 1984

[51] Int. Cl.[4] .................................................. C01F 7/60
[52] U.S. Cl. ...................................... 423/137; 423/496
[58] Field of Search ....... 423/137, 495, 496, DIG. 12, 423/210.5; 502/174, 226

[56] References Cited

U.S. PATENT DOCUMENTS

| | | | |
|---|---|---|---|
| 3,919,930 | 11/1975 | Moore | 423/210.5 |
| 4,039,648 | 8/1977 | Haupin et al. | 423/137 |
| 4,139,602 | 2/1979 | Wyndham et al. | 423/137 |
| 4,224,072 | 9/1980 | Stewart | 106/85 |

Primary Examiner—John Doll
Assistant Examiner—Jeffrey E. Russel

Attorney, Agent, or Firm—Seed and Berry

[57] ABSTRACT

In preparing $AlCl_3$ from $Al_2O_3$ at about 750°–950° C. in a carbothermic process, the rate of the reaction is increased by adding a catalytically active amount of a catalyst selected from the group consisting of:
  alkali fluorides;
  alkaline earth fluorides;
  fused mixtures of alkali, alkaline earth, or alkali and alkaline earth fluorides;
  alkaline earth carbonates;
  fused mixtures of alkali, alkaline earth, or alkali and alkaline earth carbonates;
  alkaline earth chlorides;
  alkaline earth bromides;
  alkaline earth oxides;
  sources of alkaline earth oxides or alkaline earth halides in situ by decomposition upon heating at about 750° C.; and
  mixtures thereof.

19 Claims, No Drawings

ALUMINA CHLORINATION

ACKNOWLEDGEMENT

This invention was supported with U.S. Government grants, Nos. G1105054 and G1115531, initiated under the Mineral Institutes Program, administered by the Office of Surface Mining and the Bureau of Mines.

TECHNICAL FIELD

The present invention relates to a catalytic process for preparing aluminum chloride ($AlCl_3$) by the chlorination of alumina ($Al_2O_3$).

BACKGROUND ART

Although aluminum is the third most abundant element in the earth's crust, it is never found in nature as an element, but rather occurs in more than 250 different minerals. The most important mineral groups are the alumino-silicates, clays (which are weathered silicates), and the hydrated oxides, such as bauxite. The industrial production of aluminum is based on extraction from an oxide-containing mineral, namely, bauxite, which is today's dominating raw material for the beneficiation of alumina used in the Hall-Héroult electrolytic reduction of the oxide to pure aluminum.

Usually containing between about 10-30 wt % iron (III) oxide, 4-8 wt % silica, and 2-5 wt % titania as major impurities, crude bauxite is dried, ground, and reacted in the well-known Bayer process with soda ash and lime in steel digesters to dissolve the alumina and to allow its separation from the remaining red mud. The purified alumina is transferred to an electrochemical cell where, under the Hall-Héroult process, elemental aluminum metal is formed in an electrolytic process using an $Na_3AlF_6$—$AlF_3$—$Al_2O_3$ electrolyte (i.e., a cryolite-aluminum fluoride-alumina mixture). The reduction of alumina in the cell occurs at about 970° C. according to the following simplified reaction:

$$Al_2O_3 + 3/2\ C = 2\ Al(liq) + 3/2\ CO_2\ (1\ atm)$$

Because of the huge power requirements for the direct electrochemical production of aluminum metal from alumina in the Hall-Héroult process, extensive research has been conducted to find alternative processes. Decades of research have failed to achieve an economically viable process for the direct carbothermic reduction of alumina, because the process is extremely complex, with numerous side reactions occurring. These side reactions are further enhanced and augmented by the introduction of silicon, iron, and other impurities often found in the crude ore reactants, such as bauxite. Even if pure alumina is used, the best result of the direct carbothermic reduction of alumina is the preparation of a mixture of aluminum metal and aluminum carbide, with the resulting need to decompose the carbide to the metal at about 2100° C.

Failing to find an economical process for the direct carbothermic reduction of alumina, the industry has directed its attention to the two-step process of converting alumina to aluminum chloride and then further reducing the aluminum chloride to aluminum metal. In the Toth process, for example, $AlCl_3$ is made from alumina, and pure manganese is then used for the reduction of aluminum chloride to elemental aluminum. Because the Toth process uses pure manganese, the process has been industrially and economically unattractive.

In 1973, Alcoa announced the development of a process for the production of aluminum by the electrolysis of aluminum chloride that is dissolved in a melt of alkali and alkaline earth chlorides. This electrolysis overcame the economic inviability of the manganese reduction step of the Toth process and culminated fifteen years of intensive Alcoa research. Armed with an economical method to reduce aluminum chloride to aluminum metal at significant energy savings, researchers turned to the production of aluminum chloride from alumina. Research continues today in an attempt to better understand the effects of such factors as the type of reductant, the type of aluminum-bearing material, the nature of the chlorinating agent, and the temperature and pressure effects upon the kinetics of the reaction for the different reactants and reaction conditions. Many patents have been issued relating to the production of $AlCl_3$.

The carbothermic chlorination of alumina can be represented by the following simplified general reaction:

$$Al_2O_3 + (n)C + 3Cl_2 = 2AlCl_3 + (2n-3)CO + (3-n)CO_2\ \text{where}\ 3 \geq n \geq 1.5.$$

As the reaction proceeds with the production of carbon dioxide and carbon monoxide, the carbothermic chlorination of alumina can be described by the following consecutive reactions:

$$Al_2O_3 + 3CO + 3Cl_2 = 2AlCl_3 + 3CO_2$$

$$C + CO_2 = 2CO:\ \text{Boudouard reaction}$$

Current research can be categorized in two primary classifications, namely, research into alternative sources of aluminum (e.g., kaolinic clays) and research into the reaction mechanism and preparation of $AlCl_3$ from alumina.

U.S. Pat. Nos. 4,105,752; 4,284,607; and 4,289,735 are representative of the research currently being done on the preparation of aluminum chloride. Of note, U.S. Pat. No. 4,284,607 (incorporated by reference) discusses the catalyzed chlorination of aluminous material to form aluminum chloride in the presence of alkali metal compounds as catalysts. Preferably, the catalyst is an alkali aluminum halide, such as potassium aluminum chloride, sodium aluminum chloride, rubidium aluminum chloride, and lithium aluminum chloride. The catalyst may be formed in situ by adding alkali metal compounds, such as potassium carbonate, potassium nitrate, or the like, to the reactants.

U.S. Pat. Nos. 4,139,602; 4,220,629; 4,083,927; 4,082,833; 4,288,414; 4,213,943; and 4,159,310 are representative of the current research on alternative sources of aluminum. These patents principally deal with the use of kaolinic clay as a raw material for the extraction of alumina and elemental aluminum from the ore. For example, U.S. Pat. No. 4,139,602 discloses a process for the preferential chlorination of alumina over silica in the carbo-chlorination of kaolinitic ores. The process uses alkali metal compounds with oxyanions to catalyze the reaction. These compounds are generally selected from the group consisting of alkali metal carbonates, sulfates, hydroxides, and oxides, preferably of sodium, potassium, and lithium. Additional oxyanions that may be used include thiosulfates, pyrosulfates, sulfites, nitrates, nitrites, oxalates, borates, bicarbonates, phosphates, and the like.

U.S. Pat. Nos. 4,220,629 and 4,083,927 disclose the preferential chlorination of alumina in kaolinic clays by use of a boron chloride catalyst to convert silicon chloride to aluminum chloride and silicon oxide. Similarly, U.S. Pat. No. 4,082,833 discloses the use of elemental sulfur or functionally equivalent sulfur-containing compounds as catalysts during the pre-halogenation steps of chlorinating kaolinic clays.

U.S. Pat. No. 4,213,943 discloses a staged reaction for the catalytic production of aluminum chloride from clay using an alkali metal compound and silicon tetrachloride to shift the chlorination reaction to aluminum chloride preferentially over silicon chloride. The catalyst preferably is an alkali metal compound and is normally an alkali aluminum halide of the type described in U.S. Pat. No. 4,284,607.

U.S. Pat. No. 4,283,371 discloses a continuous process for recovering substantially pure aluminum chloride from chlorination products of aluminum ore, and involves the separation of aluminum chloride from ferric chloride.

Extensive research has been undertaken to understand the catalysis of the Boudouard reaction. Research in this vein is illustrated by two articles to Dr. Y. K. Rao, et al., namely, *On the Mechanism of Catalysis of the Boudouard Reaction by Alkali-Metal Compounds*, 20 Carbon, No. 3, 207–212 (1982), and *A Study of the Rates of Catalyzed Boudouard Reaction*, 16 Carbon 175–184 (1978). These articles disclose that lithium oxide, lithium carbonates, and alkali carbonates are useful catalysts of the Boudouard reaction.

Although extensive research has been directed to the problem of preparing aluminum chloride economically, a viable solution has yet to be achieved.

Improvements in the catalyzed production of aluminum chloride are presented in this invention, which describes an economical process for producing $AlCl_3$.

DISCLOSURE OF INVENTION

A carbothermic method for preparing aluminum chloride comprises the step of contacting a suitable aluminum source with a suitable chlorinating agent in the presence of a suitable carbonaceous reducing agent at an elevated temperature. The kinetics of the reaction are enhanced by conducting the reaction in the presence of a catalytically active amount of a catalyst selected from the group consisting of:
  alkali metal fluorides;
  alkaline earth fluorides;
  fused mixtures of alkali, alkaline, or alkali and alkaline fluorides;
  alkaline earth carbonates;
  fused mixtures of alkali, alkaline earth, or alkali and alkaline earth carbonates;
  alkaline earth chlorides;
  alkaline earth oxides;
  sources of alkaline earth chlorides and alkaline earth oxides, which form these compounds upon heat decomposition in situ at a temperature of about 750° C.;
  cryolites; and
  mixtures thereof.
There catalysts greatly increase the rate of reaction for the conversion of alumina to aluminum chloride, apparently either through an aluminum chloro complex or through an aluminum fluorochloro complex.

BEST MODE FOR CARRYING OUT THE INVENTION

For purposes of this description, an "alkali metal" shall mean any element found in Group IA of the Periodic Table, and preferably lithium, sodium, and potassium. "Alkaline earth" or "alkaline earth metal" shall mean any element of Group IIA of the Periodic Table, and preferably magnesium or calcium. "Fused materials" shall mean solid mixtures of the catalysts formed by mixing together a predetermined amount of each of the separate compounds, melting the compounds in a furnace under a nitrogen gas atmosphere to form a solution of the compounds, and subsequently solidifying the melt. Usually, the resulting fused material is ground to a powder for use as a catalyst.

The examples use materials available from the following sources. Alumina (99.5+wt % $Al_2O_3$ with minor impurities of sodium oxide, silicon oxide, and ferric oxide) was supplied by Alcoa. Carbon-black, Sterling FT (99.5 wt % carbon), was supplied by the Cabot Corporation. Activated (Wood) charcoal in fine powder form having 86.8 wt % carbon was supplied from Mallinckrodt Inc. Metallurgical Coke A ($-44$ $\mu$m size) having 86.0 wt % carbon was supplied by the U.S. Steel Corporation, Salt Lake City operation. Ultrapure helium, being at least 99.995%, was supplied from Airco Inc. Chlorine gas having a sum of nitrogen, oxygen, carbon dioxide, and water less than 1000 ppm was supplied from the Matheson Company.

In the examples, powdered alumina and carbon were well mixed and were placed in pre-measured amounts in a pre-weighed crucible. The desired amount of each catalyst was added to the crucible and the chlorination reaction was allowed to proceed in a heated furnace under an atmosphere of chlorine and helium gas. The degree of reaction was measured by the total weight loss of the sample held in the crucible, which represented the loss of carbon and oxygen as carbon monoxide and carbon dioxide, and the weight loss of aluminum from the alumina as aluminum chloride was formed.

The catalysts apparently react through two reaction mechanisms, namely, a chloro complex or a fluorochloro complex. For an MgO catalyst (as well as for compounds that break down quickly into MgO or $MgCl_2$), the catalysis is theorized to occur in the following manner:

(a) Chlorination of MgO(s):

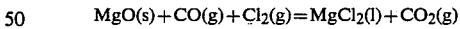
$$MgO(s)+CO(g)+Cl_2(g)=MgCl_2(l)+CO_2(g)$$

(b) Vaporization of chloride intermediate:
$$MgCl_2(l)=MgCl_2(g)$$

(c) Formation of a complex chloride species by the chlorination reaction:

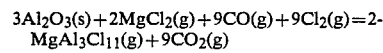
$$3Al_2O_3(s)+2MgCl_2(g)+9CO(g)+9Cl_2(g)=2MgAl_3Cl_{11}(g)+9CO_2(g)$$

(d) Decomposition of the complex chloride with the subsequent release of the catalyst intermediate:

$$MgAl_3Cl_{11}(g)=MgCl_2(g)+3AlCl_3(g)$$

The fluoride catalysts likely form a fluorochloro complex, and one possible mechanism is detailed as follows for $MgF_2$:

(a) Vaporization of fluoride catalyst:

$$MgF_2(s) = MgF_2(g)$$

(b) Chlorination step:

$$3Al_2O_3(s) + 2MgF_2(g) + 9CO(g) + 9Cl_2(g) = 2\text{-}MgAl_3F_2Cl_9(g) + 9CO_2(g)$$

(c) Decomposition of the complex species:

$$MgAl_3F_2Cl_9(g) = MgF_2(g) + 3AlCl_3(g)$$

The catalysis is attributed to enhancing the rate of the chlorination step, which is reasonable in light of findings that catalysts such as MgO, $MgCl_2$, and $MgF_2$ have little effect on the reaction rate of the Boudouard reaction. Since little is known about the thermodynamics and kinetics of the critical reactions that produce the intermediate complexes, it is difficult to draw any firm conclusions with regard to the validity of these postulated mechanisms. They are presented as possibilities rather than proven sequences.

In the presence of chlorine gas, the possibility of catalysis of the Boudouard reaction by these catalysts is unlikely. In fact, chlorine gas probably diminishes the reactivity of carbon in this situation. Thus, the observed catalysis cannot simply be attributed to the rate enhancing characteristics of these various catalysts vis-a-vis the Boudouard reaction. It is more likely that the catalysis involves formation of complexes as postulated.

At a temperature of 800° C., a partial pressure of chlorine gas of 0.27 atm, and stoichiometric amounts of carbon and alumina, the kinetics of the chlorination reaction were enhanced to the greatest extent by using activated charcoal. Carbon-black was the second best performer, although in its early stages, coke breeze or metallurgical coke has an initially higher rate of reaction. Because of the high content of volatile impurities in the activated charcoal, it was extremely difficult for experimental purposes to use this source of carbon; therefore, carbon-black was selected as the best type of carbon for kinetic research. CO, $COCl_2$, and $CCl_4$ probably are suitable reactants, also. Generally, the rate of reaction increases with an increase in the ratio of carbon to alumina, showing that the reaction is driven to completion by the provision of excess carbon. When the mixture of carbon and alumina particles is well crushed and well mixed prior to the reaction, the rate is enhanced, probably because a larger proportion of the alumina particles are in close contact with carbon. The rate of reaction is affected by the reactivity of carbon as just explained, even when the carbon and alumina are well mixed, thereby supporting the view that the reaction proceeds with the initial formation of carbon monoxide, which then becomes the primary reducing agent in the chlorination process. The overall reaction probably has little contribution provided by the direct reaction of carbon with alumina.

At the elevated temperatures of the present invention, namely, between about 750°–950° C., the effect of pressure on the overall reaction was found to be nominal. An increase in the temperature or an increase in the partial pressure of chlorine gas, however, each had positive effects on the reaction rate. The reaction rate constant $k_m$ (g/g·min), therefore, is not only a function of the temperature, as described by the Arrhenius equation, but is also a function of the partial pressure of chlorine. These effects are illustrated in Tables 1 and 2 as follows:

TABLE 1

Reaction rate constant $k_m$ (g/g · min) at different temperatures and partial pressure of chlorine.

| $P_{Cl_2}$ (atm) | $k_m$ T° C. | | | | |
|---|---|---|---|---|---|
| | 751 | 801 | 851 | 898 | 950 |
| 0.15 | 0.15 | 0.48 | 0.80 | 1.08 | 1.56 |
| 0.27 | 0.37 | 0.82 | 1.28 | 1.66 | 2.27 |
| 0.40 | 0.52 | 1.08 | 1.44 | 2.16 | 2.79 |
| 0.59 | 0.79 | 1.38 | 2.19 | 2.59 | 3.49 |

TABLE 2

Values of the total rate constant K (g/g · min · atm) at different temperatures and partial pressures of chlorine.

| $P_{Cl_2}$ (atm) | $k_m$ T° C. | | | | |
|---|---|---|---|---|---|
| | 751 | 801 | 851 | 898 | 950 |
| 0.15 | 0.15 | 0.48 | 0.80 | 1.08 | 1.56 |
| 0.27 | 0.37 | 0.82 | 1.28 | 1.66 | 2.27 |
| 0.40 | 0.52 | 1.08 | 1.44 | 2.16 | 2.79 |
| 0.59 | 0.79 | 1.38 | 2.19 | 2.59 | 3.49 |

The linear dependence of the activation energy on the chlorine concentration suggests that the measured rate constant ($k_m$) is probably dependent in part upon mass transfer effects and adsorption effects.

The following examples serve to illustrate the catalytic behavior of the present invention.

EXAMPLE 1

Fine-grained alumina was mixed with carbon-black in the proportion of $Al_2O_3/C = \frac{1}{3}$ and a sample of the mixture was reacted at 770° C. in a gas stream containing 0.27 atm $Cl_2$ and 0.73 atm He. To another sample of the same mixture, 3 wt % MgO was added as a catalyst and the reaction was carried out under conditions identical to those used in the uncatalyzed experiment. The following is a summary of the results:

| | Reaction time, min | | | |
|---|---|---|---|---|
| | 15 | 30 | 45 | 60 |
| % reacted (Uncatalyzed) | 8.5 | 20 | 27 | 35 |
| % reacted (Catalyzed) | 20 | 44 | 63 | 80 |

EXAMPLE 2

Isothermal kinetic experiments performed at 770° C. reveal the catalytic activity of $MgF_2$. The uncatalyzed mixture composed of $Al_2O_3$ and carbon-black mixed in the 1:3 proportion of Example 1 was reacted in a 27% $Cl_2$–73% He gas mixture at a total pressure of 1 atm. In a separate experiment, conducted under practically identical conditions, 3 wt % $MgF_2$ catalyst was added to the $Al_2O_3 + 3C$ mixture. The results were as follows:

| | Reaction time, min | | | |
|---|---|---|---|---|
| | 15 | 30 | 45 | 60 |
| % reacted (Uncatalyzed) | 9 | 20 | 29 | 36.5 |

|  | Reaction time, min | | | |
|---|---|---|---|---|
|  | 15 | 30 | 45 | 60 |
| % reacted (Catalyzed) | 28 | 52 | 68 | 82.5 |

EXAMPLE 3

This example is designed to illustrate the catalytic activity of a unique type of catalyst—one that is formed by the incipient fusion of three halides. This ternary eutectic catalyst was made by fusing together $CaF_2$, $MgF_2$, and NaF in the molar ratio of 23:12:65, respectively. Its melting point is 750° C., which is far below the melting point of any individual component.

A sample of the uncatalyzed $Al_2O_3+3C$ mixture was reacted at 770° C. under a 27% $Cl_2+73\%$ He gas mixture and the isothermal kinetics monitored carefully. In a separate experiment, the $Al_2O_3+3C$ sample suitably doped with 3 wt % ternary $CaF_2$—$MgF_2$—NaF catalyst was reacted under identical conditions. The results are as follows:

|  | Reaction time, min | | | |
|---|---|---|---|---|
|  | 15 | 30 | 45 | 60 |
| % reacted (Uncatalyzed) | 7 | 20 | 30 | 37 |
| % reacted (Catalyzed) | 29 | 50 | 67 | 78 |

EXAMPLE 4

Finely divided alumina and carbon-black (Sterling FT) were mixed in the 1:3 molar production of the other examples. The uncatalyzed sample was reacted at 800° C. in a gas mixture containing 27% $Cl_2$ and 73% He. The kinetics of chlorination were monitored by the weight loss measurement technique. To the uncatalyzed mixture ($Al_2O_3+3C$), 5 wt % $CaF_2$ was added, and the chlorination experiment was conducted at 800° C. under identical conditions. The following results affirm the catalytic behavior of $CaF_2$ as a catalyst:

|  | Reaction time, min | | |
|---|---|---|---|
|  | 10 | 20 | 30 |
| % reacted (Uncatalyzed) | 8 | 18 | 27 |
| % reacted (Catalyzed) | 25.5 | 37 | 45 |

EXAMPLE 5

This example illustrates the catalytic behavior of NaF catalyst. An uncatalyzed $Al_2O_3+3C$ mixture was reacted isothermally at 800° C. under a flowing stream of 27% $Cl_2+73\%$ He. To a sample of the uncatalyzed mixture, 5 wt % NaF was added, and the reaction was carried out under similar conditions. The results were:

|  | Reaction time, min | | |
|---|---|---|---|
|  | 10 | 20 | 30 |
| % reacted (Uncatalyzed) | 8 | 18 | 27 |
| % reacted (Catalyzed) | 28 | 35 | 42.5 |

EXAMPLE 6

Fine alumina and carbon-black (Sterling FT) were mixed thoroughly and the composition of the mixture approximated $Al_2O_3+3C$. A sample of the uncatalyzed mixture was taken in a cylindrical quartz crucible, which was then contacted with a gas stream containing 27% $Cl_2$ and 73% He at 800° C. For the catalyzed experiment, the mixture was doped with 5 wt % LiF and the kinetic experiment was conducted similarly. The results were:

|  | Reaction time, min | | |
|---|---|---|---|
|  | 10 | 20 | 30 |
| % reacted (Uncatalyzed) | 8 | 17.5 | 27 |
| % reacted (Catalyzed) | 29.5 | 44 | 48 |

EXAMPLE 7

That the catalytic activity of NaF is significant even at higher temperatures and higher chlorine contents is demonstrated by this example. The uncatalyzed $Al_2O_3+3C$ mixture is reacted at 900° C. in a 58% $Cl_2+42\%$ He gas stream and the kinetics monitored thermogravimetrically, as with all the examples. To a sample of the $Al_2O_3+3C$ mixture, 5 wt % NaF was added, and the chlorination reaction was conducted under identical conditions. The results were:

|  | Reaction time, min | | | |
|---|---|---|---|---|
|  | 5 | 10 | 15 | 20 |
| % reacted (Uncatalyzed) | 13.8 | 28.6 | 41.9 | 53.6 |
| % reacted (catalyzed) | 17.1 | 38.2 | 50.4 | 62.7 |

EXAMPLES 8-10

In this series of experiments, the catalytic activities of three different magnesium compounds were investigated. The uncatalyzed $Al_2O_3+3C$ mixture was chlorinated at 800° C. in a gas mixture consisting of 27% $Cl_2$ and 73% He. Three catalysts were then tested, each separately. These were: magnesium sulfate, $MgSO_4$; magnesium hydroxide, $Mg(OH)_2$; and magnesium acetate, $Mg(C_2H_3O_2)_2.4H_2O$. In each catalyzed experiment, 5 wt % of the specific catalyst was added to the $Al_2O_3+3C$ mixture and the well-mixed sample was then chlorinated under conditions similar to those employed in the uncatalyzed chlorination. The results were:

|  | Reaction time, min | | | | |
|---|---|---|---|---|---|
|  | 5 | 10 | 20 | 30 | 40 |
| % reacted (Uncatalyzed) | 4.6 | 9.0 | 18.1 | 27.3 | 35.3 |
| % reacted (Sulfate) | 9.8 | 21.8 | 44.3 | 64.2 | 76.5 |
| % reacted (Hydroxide) | 10.1 | 21.4 | 43.3 | 62.2 | 75.8 |
| % reacted (Acetate) | 11.0 | 22.0 | 43.8 | 61.6 | 72.9 |

On the strength of these examples, one can infer that other magnesium compounds which, upon heating decompose to produce MgO(s) will also exhibit excellent catalytic activities.

EXAMPLE 11

This example demonstrates the reusability of the MgO catalyst. In one experiment, the catalyzed mixture containing 5% MgO was fully reacted until all of the alumina had been chlorinated. The residue left behind in the crucible at the conclusion of this experiment was tested for its potential catalytic effect. The following data pertains to the three different runs. The first, to the uncatalyzed chlorination of $Al_2O_3+3C$ performed at 800° C. in the presence of a 27% $Cl_2+73\%$ He gas mixture; the second, to a catalyzed mixture containing 5 wt % MgO; the third, to a catalyzed mixture containing 5 wt % of the residue. The second and third runs were conducted at 800° C. in the presence of a 27% $Cl_2+73\%$ He gas mixture. The results were:

|  | Reaction time, min | | | | | |
| --- | --- | --- | --- | --- | --- | --- |
|  | 5 | 10 | 20 | 30 | 40 | 50 |
| % reacted (Uncatalyzed) | 4.6 | 9.0 | 18.1 | 27.3 | 35.3 | 44.0 |
| % reacted (5 wt % MgO) | 10.7 | 23.0 | 46.3 | 66.1 | 77.4 | 81.5 |
| % reacted (5 wt % residue) | 10.8 | 22.3 | 44.4 | 62.4 | 72.4 | 75.5 |

The recycled catalyst (i.e., residue) had approximately the same activity as the fresh catalyst.

EXAMPLES 12–13

These examples compare the catalytic activities of two different catalytic additives. All the experiments were done at 800° C. under a 27% $Cl_2+73\%$ He gas atmosphere. The catalysts tested were $MgCl_2$ and a fused ternary eutectic $(K, Li, Na)_2CO_3$ compound each added in the amount of 5 wt %. The ternary eutectic was prepared by fusing together $K_2CO_3$, $Li_2CO_3$, and $Na_2CO_3$ mixed in equimolar proportions. The fused mass was solidified and ground prior to mixing with the reactants. The results were:

|  | Reaction time, min | | | | | |
| --- | --- | --- | --- | --- | --- | --- |
|  | 5 | 10 | 20 | 30 | 40 | 50 |
| % reacted (Uncatalyzed) | 4.6 | 9.0 | 18.1 | 27.3 | 35.3 | 44.0 |
| % reacted ($MgCl_2$) | 10.4 | 22.0 | 43.5 | 62.2 | 73.8 | 77.2 |
| % reacted (ternary) | 15.1 | 22.6 | 35.3 | 43.8 | 50.1 | 54.9 |

The ternary eutectic is a better catalyst in the initial stages, after which its activity tapers off.

EXAMPLE 14

This example illustrates the use of industrial grade materials. Here, coke breeze was used as the reductant. The uncatalyzed mixture made up of alumina and coke breeze was reacted at 800° C. and in a flowing stream containing 27% $Cl_2$ and 73% He. In the catalyzed experiment, NaF in the amount of 5 wt % was added and the mixture was reacted under the same conditions. The results were:

|  | Reaction time, min | | | | | |
| --- | --- | --- | --- | --- | --- | --- |
|  | 5 | 10 | 20 | 30 | 40 | 50 |
| % reacted (Uncatalyzed) | 7.24 | 11.2 | 17.2 | 21.5 | 24.2 | 26.1 |
| % reacted (Catalyzed) | 10.0 | 23.3 | 33.3 | 35.6 | 36.6 | — |

These results show that NaF is active even with coke breeze. The other catalysts are thought to have similar catalytic effect with coke breeze (powdered metallurgical coke) as a source of carbon.

EXAMPLE 15

This example illustrates the use of alternative sources of aluminum. Here, dehydrated Georgia clay ($Al_2O_3$—$2SiO_2$—$2H_2O$) was used instead of alumina. It was mixed with carbon-black in the proportion of $Al_2O_3/C=\frac{1}{3}$ and $SiO_2/C=\frac{1}{2}$ so that the mixture contained 7 g.atoms C per g.mole of $Al_2O_3$ in the clay. A sample of the mixture was loaded into a quartz crucible and was reacted isothermally at 910° C. using a 27% $Cl_2+73\%$ He gas mixture. To test the effect of the catalyst, to the uncatalyzed mixture, 3.5 wt % MgO was added, and the catalyzed sample was chlorinated under conditions that differed little from those used in the uncatalyzed experiment. The results were:

|  | Reaction time, min | | | |
| --- | --- | --- | --- | --- |
|  | 2 | 4 | 10 | 20 |
| % reacted (Uncatalyzed) | 2.4 | 2.7 | 3.3 | 3.8 |
| % reacted (Catalyzed) | 5.3 | 10.8 | 19.2 | 22.6 |

This example did not determine the relative proportions of $AlCl_3$ and $SiCl_4$ formed.

EXAMPLE 16

This example illustrates the negligible catalytic activity of MgO on the Boudouard reaction ($C+CO_2=2CO$).

Samples of carbon-black (Sterling FT) were packed into quartz crucibles and were reacted with an 87% $CO_2+13\%$ He gas mixture under isothermal conditions at 913° C. The weight loss was monitored continuously. In a second experiment, the carbon-black was mixed with 3 wt % MgO and the reaction was carried out under essentially similar conditions. The results were:

|  | Reaction time, min | | | | | |
| --- | --- | --- | --- | --- | --- | --- |
|  | 5 | 10 | 15 | 20 | 25 | 30 |
| % reacted (Uncatalyzed) | 1.2 | 2.1 | 2.1 | 2.3 | 2.7 | 3.2 |
| % reacted (Catalyzed) | 1.2 | 1.7 | 2.1 | 2.5 | 2.9 | 3.4 |

Within the limits of experimental accuracy, the MgO catalyst had no discernible effect on the Boudouard reaction.

The description and these examples illustrate the applicability of the catalysts of this invention to increase the rate of reaction of alumina to $AlCl_3$ in the presence of a suitable source of chlorine and a suitable carbonaceous reductant. The preferred catalysts are alkali fluorides, alkaline earth fluorides, alkaline earth oxides, fused mixtures thereof, and compounds which readily form these catalytic compounds in situ. More preferably, the catalysts comprise 2–5 wt % of MgO, $MgF_2$, $CaF_2$, fused $CaF_2$—$MgF_2$—NaF, or fused $K_2CO_3$—$Li_2CO_3$—$Na_2CO_3$. The catalyst is about 95% as effective at 2 wt % as it is at 5 wt %. Higher concentrations of catalysts do not greatly alter the rate of reaction.

While chloro- and fluoro-compounds are described, the invention probably encompasses all alkali or alkaline earth halides. The higher halides are economically unattractive.

While preferred embodiments of the present invention have been illustrated, those skilled in the art will recognize alterations or modifications which might be made without departing from the inventive concept. The examples are given to illustrate the invention, not to limit it. The proposed mechanisms are presented to help explain the basis for the catalytic activity. Thus, the invention should not be limited to the preferred embodiments or by theory, unless limitation is necessary in light of the relevant prior art.

We claim:

1. A carbothermic method for preparing $AlCl_3$, comprising the steps of contacting aluminum containing ore with chlorine in the presence of a carbonaceous reducing agent at an elevated temperature of and between 750°–950° C., the reaction occurring in the presence of a catalytically active amount of a catalyst selected from the group consisting of:
- alkaline earth carbonates;
- fused mixtures of alkaline earth carbonates;
- fused mixtures of alkali and alkaline earth carbonates;
- alkaline earth oxides;
- sources of alkaline earth oxides upon heat decomposition in situ at a temperature of about 750° C.;
- and mixtures thereof.

2. The method of claim 1 wherein the catalyst is selected from the group consisting of:
- MgO;
- $MgCO_3$;
- $MgSO_4$;
- $Mg(OH)_2$;
- $Mg(C_2H_3O_2)_2 \cdot 4H_2O$;
- and mixtures thereof.

3. The method of claim 1 wherein the catalyst is selected from the group consisting of alkaline earth carbonates.

4. The method of claim 1 wherein the catalyst is selected from the group consisting of alkaline earth oxides.

5. The method of claim 1 wherein the catalyst is selected from the group consisting of fused mixtures of alkaline earth carbonates, or alkali and alkaline earth carbonates.

6. A carbothermic method for preparing $AlCl_3$ from $Al_2O_3$ in the presence of a carbonaceous reducing agent and chlorine gas at an elevated temperature between about 750°–950° C., the method comprising the step of:
reacting the $Al_2O_3$ with the $Cl_2$ in the presence of the carbonaceous reducing agent and in the presence of a catalytically active amount of a catalyst selected from the group consisting of:
- alkaline earth carbonates;
- fused mixtures of alkaline earth carbonates;
- fused mixtures of alkali and alkaline earth carbonates;
- alkaline earth oxides;
- sources of alkaline earth oxides upon heat decomposition in situ at a temperature of about 750° C.; and
- mixtures thereof.

7. The method of claim 6 wherein the molar ratio of carbon to aluminum is at least about 3:1 and wherein the catalyst comprises about 2–5 wt % of the reactants.

8. The method of claim 1 wherein the catalyst is selected from the group of catalysts which catalyze the reaction through a pathway having MgO(s) as an active intermediate.

9. The method of claim 7 wherein the catalyst is selected from the group consisting of:
- MgO;
- $MgCO_3$;
- $MgSO_4$;
- $Mg(OH)_2$;
- $Mg(C_2H_3O_2)_2 \cdot 4H_2O$; and
- mixtures thereof.

10. The method of claim 7 wherein the $Al_2O_3$ is provided by a compound selected from the group consisting of alumina, bauxite, kaolinic clays, or mixtures thereof in a finely ground, powdered form, and wherein the carbonaceous reducing agent is selected from the group consisting of carbonblack, activated charcoal, metallurgical coke, coke breeze, CO, $COCl_2$, $CCl_4$, and mixtures thereof.

11. The method of claim 9 wherein the $Al_2O_3$ is provided by a compound selected from the group consisting of alumina, bauxite, kaolinic clays, or mixtures thereof in a finely ground, powdered form, and wherein the carbonaceous reducing agent is selected from the group consisting of carbonblack, activated charcoal, metallurgical coke, coke breeze, CO, $COCl_2$, $CCl_4$, and mixtures thereof.

12. A carbothermic method for preparing $AlCl_3$ from $Al_2O_3$, comprising the step of:
reacting the $Al_2O_3$ with the $Cl_2(g)$ in the presence of a carbonaceous reducing agent at an elevated temperature of between about 750°–950° C., the reaction being catalyzed by a catalytically active amount of a catalyst selected from the group consisting of:
- MgO;
- $MgCO_3$;
- $MgSO_4$;
- $Mg(OH)_2$;
- $Mg(C_2H_3O_2)_2 \cdot 4H_2O$; and
- mixtures thereof.

13. The method of claim 12 wherein the catalyst includes MgO.

14. The method of claim 12 wherein the catalyst includes $MgCO_3$.

15. The method of claim 12 wherein the catalyst includes $MgSO_4$.

16. The method of claim 12 wherein the catalyst includes $Mg(OH)_2$.

17. The method of claim 12 wherein the catalyst includes $Mg(C_2H_3O_2)_2 \cdot 4H_2O$.

18. The method of claim 12 wherein the carbonaceous reducing agent is a solid at room temperature, wherein the $Al_2O_3$ is provided by alumina, bauxite, or kaolinic clay, and wherein the $Al_2O_3$ and carbonaceous reducing agent are mixed with the catalyst to form a mixture having a C/Al molar ratio of at least about stoichiometric proportions and 2–5% wt % catalyst.

19. The method of claim 18 wherein the partial pressure of the gaseous chlorine is between about 0.15–0.60 atm.

* * * * *

UNITED STATES PATENT AND TRADEMARK OFFICE
CERTIFICATE OF CORRECTION

PATENT NO. : 4,565,674
DATED : January 21, 1986
INVENTOR(S) : Yalamanchili K. Rao and Mohamad K. Soleiman It is certified that error appears in the above—identified patent and that said Letters Patent is hereby corrected as shown below:

column 11, line 50, change "claim 1 wherein" to read --claim 7 wherein--.

Signed and Sealed this

Twenty-fourth Day of June 1986

[SEAL]

Attest:

DONALD J. QUIGG

Attesting Officer

Commissioner of Patents and Trademarks